US012217231B2

(12) United States Patent
Trimble et al.

(10) Patent No.: US 12,217,231 B2
(45) Date of Patent: Feb. 4, 2025

(54) SYSTEMS AND METHODS FOR EMBEDDABLE POINT-OF-SALE TRANSACTIONS

(71) Applicant: TALKSHOPLIVE, INC., West Hollywood, CA (US)

(72) Inventors: Jacob Trimble, West Hollywood, CA (US); Tina Moore, West Hollywood, CA (US); Bryan Moore, West Hollywood, CA (US)

( * ) Notice: Subject to any disclaimer, the term of this patent is extended or adjusted under 35 U.S.C. 154(b) by 0 days.

(21) Appl. No.: 17/476,076

(22) Filed: Sep. 15, 2021

(65) Prior Publication Data

US 2022/0005111 A1  Jan. 6, 2022

Related U.S. Application Data

(63) Continuation of application No. 17/279,392, filed as application No. PCT/US2019/052488 on Sep. 23, 2019, now abandoned.

(60) Provisional application No. 62/736,431, filed on Sep. 25, 2018.

(51) Int. Cl.
```
G06Q 30/00      (2023.01)
G06Q 20/12      (2012.01)
G06Q 20/20      (2012.01)
G06Q 20/40      (2012.01)
G06Q 30/0601    (2023.01)
H04N 21/478     (2011.01)
H04N 21/4788    (2011.01)
```

(52) U.S. Cl.
CPC ......... *G06Q 20/123* (2013.01); *G06Q 20/202* (2013.01); *G06Q 20/401* (2013.01); *G06Q 30/0641* (2013.01); *G06Q 30/0643* (2013.01); *H04N 21/47815* (2013.01); *H04N 21/4788* (2013.01)

(58) Field of Classification Search
CPC .. G06Q 20/401; G06Q 20/123; G06Q 20/202; G06Q 30/0641; G06Q 30/0643; H04N 21/47815; H04N 21/4788
See application file for complete search history.

(56) References Cited

U.S. PATENT DOCUMENTS 7,975,019 B1*  7/2011  Green ............... G06Q 30/0641
                                                705/26.1
8,121,902 B1*  2/2012  Desjardins ........ G06Q 30/0601
                                                705/26.1
8,458,053 B1*  6/2013  Buron ............... H04N 21/4316
                                                705/26.1

(Continued)

OTHER PUBLICATIONS

"Introducing Ever—The New Way to Discover & Purchase Everything Inside Videos," Business Wire [New York], Mar. 16, 2016 (Year: 2016).*

(Continued)

*Primary Examiner* — Anne M Georgalas
(74) *Attorney, Agent, or Firm* — Withers Bergman LLP; Gina A. Bibby

(57) ABSTRACT

The present disclosure relates to methods and systems for delivering online multi-media content in a manner that provides embedded point-of-sale transaction functionality so that a user can simultaneously view the online multi-media content and purchase product(s) and/or service(s) associated with and/or featured in such content.

29 Claims, 8 Drawing Sheets

(56) References Cited

U.S. PATENT DOCUMENTS

| | | | | |
|---|---|---|---|---|
| 8,812,956 | B1* | 8/2014 | Rosenbaum | H04N 21/25891 |
| | | | | 715/716 |
| 9,535,560 | B1* | 1/2017 | Kominac | H04L 67/02 |
| 9,710,824 | B1* | 7/2017 | Battles | G06Q 30/0255 |
| 10,708,391 | B1* | 7/2020 | Manj | H04L 65/4015 |
| 2001/0044821 | A1* | 11/2001 | Dunkin | H04L 67/04 |
| | | | | 709/202 |
| 2005/0022226 | A1* | 1/2005 | Ackley | H04N 21/8583 |
| | | | | 725/23 |
| 2006/0089843 | A1* | 4/2006 | Flather | G06Q 30/06 |
| | | | | 705/1.1 |
| 2008/0253739 | A1* | 10/2008 | Livesey | H04N 7/17318 |
| | | | | 386/239 |
| 2009/0094525 | A1* | 4/2009 | Coelius | G06Q 30/00 |
| | | | | 715/741 |
| 2009/0276805 | A1* | 11/2009 | Andrews, II | H04N 21/812 |
| | | | | 725/38 |
| 2010/0153831 | A1* | 6/2010 | Beaton | G06Q 30/02 |
| | | | | 715/201 |
| 2010/0279766 | A1* | 11/2010 | Pliska | H04N 21/47815 |
| | | | | 463/43 |
| 2011/0052144 | A1* | 3/2011 | Abbas | G11B 27/036 |
| | | | | 386/349 |
| 2011/0246290 | A1* | 10/2011 | Howard | G06Q 30/0277 |
| | | | | 715/764 |
| 2012/0084811 | A1* | 4/2012 | Thompson | H04N 21/812 |
| | | | | 725/34 |
| 2012/0209708 | A1* | 8/2012 | Ramer | G06F 16/9535 |
| | | | | 705/14.51 |
| 2013/0151352 | A1* | 6/2013 | Tsai | H04N 21/4438 |
| | | | | 705/14.73 |
| 2014/0108585 | A1* | 4/2014 | Barton | G06F 16/9577 |
| | | | | 709/213 |
| 2014/0130103 | A1* | 5/2014 | Singh | H04N 21/44008 |
| | | | | 725/60 |
| 2014/0189514 | A1* | 7/2014 | Hilliard | G06Q 30/06 |
| | | | | 715/719 |
| 2014/0258029 | A1* | 9/2014 | Thierry | G06Q 30/0643 |
| | | | | 705/26.8 |
| 2014/0379533 | A1* | 12/2014 | Liberson | G06Q 30/0643 |
| | | | | 705/27.2 |
| 2015/0249872 | A1 | 9/2015 | Lee et al. | |
| 2016/0012518 | A1 | 1/2016 | Giorgalli | |
| 2016/0027067 | A1* | 1/2016 | Zindler | H04N 21/4725 |
| | | | | 705/14.72 |
| 2019/0236661 | A1* | 8/2019 | Hogg | G06Q 30/0641 |

OTHER PUBLICATIONS

Techopedia—URL Redirect, dated Jul. 4, 2018 (Year: 2018).*
Google Search Central—Redirects and Google Search, accessed Nov. 14, 2014 (Year: 2014).*
"Introducing Ever—The New Way to Discover & Purchase Everything Inside Videos," Business Wire [New Wire], Mar. 16, 2016 (Year: 2016).*

* cited by examiner

SYSTEMS AND METHODS FOR EMBEDDABLE POINT-OF-SALE TRANSACTIONS

RELATED APPLICATIONS

The present application is a continuation of U.S. patent application Ser. No. 17/279,392, filed Mar. 24, 2021, entitled "Systems and Methods for Embeddable Point-of-Sale Transactions," which claims priority to PCT/US2019/052488, filed Sep. 23, 2019, entitled "Systems and Methods for Embeddable Point-of-Sale Transactions," which claims priority to U.S. Provisional Application No. 62/736,431, filed Sep. 25, 2018, entitled "Systems and Methods for Embeddable Point-of-Sale Transactions," each of which is incorporated herein by reference in its entirety.

TECHNICAL FIELD

The present disclosure relates generally to methods and systems for delivering online content. More particularly, but not exclusively, this disclosure relates to methods and systems for delivering online multi-media content in a manner that provides embedded point-of-sale transaction functionality so that a user can simultaneously view the online multi-media content and purchase product(s) and/or service (s) associated with and/or featured in such content.

SUMMARY OF THE INVENTION

Provided herein is a system for delivering online content and a method for doing the same consistent with embodiments of the present disclosure. In one embodiment, the system includes an external platform and an embeddable application, wherein the embeddable application is configured to deliver multi-media content to the external platform so that a user of the external platform can view the multi-media content and purchase product(s) and/or service(s) associated with and/or featured in the multi-media content while the multi-media is displayed. In one embodiment, the external platform is a computing device such as desktop computer, laptop computer, tablet, smartphone, smartTV, wearable device, device enabled clothing. In one embodiment, the system also includes a server on which the embeddable application resides that is coupled to the external platform via a network. In one embodiment, the external platform includes an application that includes a reference to server. The reference is configured to resolve to the server when a user opens the application on the external platform, which causes the server to invoke the embeddable application to deliver the multi-media content to the external platform. In one embodiment, the reference is an (frame or a script. In one embodiment, the server also include a database that is coupled to the embeddable application. The database is configured to store transactional data related to a purchase request received by the embeddable application. In one embodiment, the server also includes a payment processing service that is coupled to the embedded application. The payment processing service is configured to validate the purchase request. In one embodiment, the embeddable application is configured to cause the multi-media content to be loaded into a viewing area of a graphical user interface on the external platform. In one embodiment, the graphical user interface also includes at least one feature selected from a group consisting of live chat, purchasing the products and/or the services featured in the multi-media content, shopping cart, share content, like content, navigation tools, content owner avatar, multi-media content information, or information about the products and/or the services featured in the multi-media content. In one embodiment, the server also includes an asset storage coupled to the embedded application. The asset storage is configured to store at least one asset selected from a group consisting of the graphical user interface, images of products for use by the embeddable application, software associated with the embedded application, or the multi-media content. In one embodiment, the multi-media content delivered to an external platform is live or pre-recorded.

BRIEF DESCRIPTION OF THE DRAWINGS

The written disclosure herein describes illustrative embodiments that are non-limiting and non-exhaustive. Reference is made to certain illustrative embodiments that are depicted in the figures, wherein.

DETAILED DESCRIPTION

Figure 1:
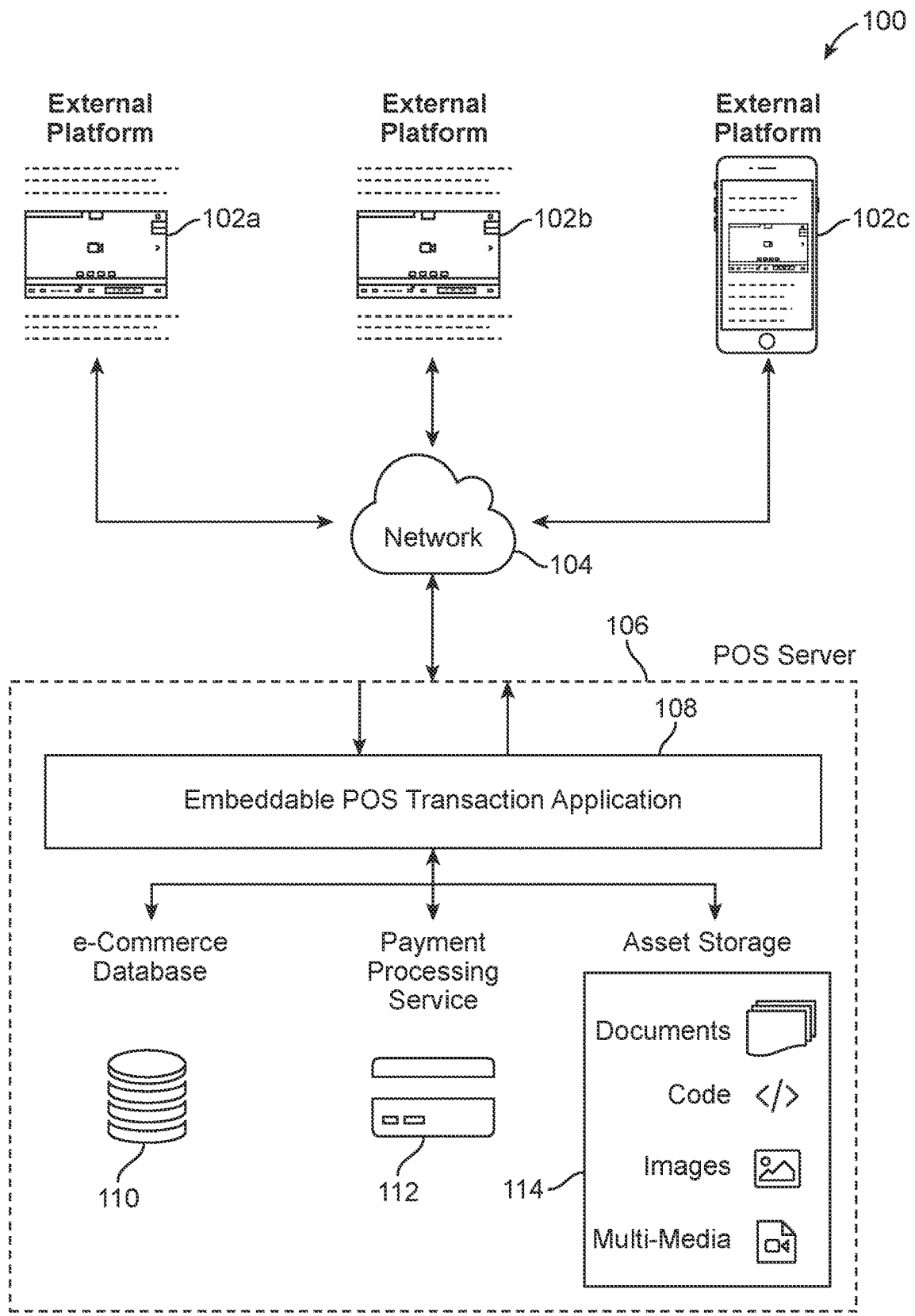
FIG. 1 illustrates a block diagram of an exemplary system for delivering point-of-sale-transaction embedded multi-media content consistent with embodiments of the present disclosure.

A detailed description of methods and systems consistent with embodiments of the present disclosure is provided below. While several embodiments are described, it should be understood that the disclosure is not limited to any one embodiment, but instead encompasses numerous alternatives, modifications and equivalents. In addition, while numerous specific details are set forth in the following description to provide a thorough understanding of the embodiments disclosed herein, some embodiments can be practiced without some or all of these details. Moreover, for the purposes of clarity, certain material that is known in the related art has not been described in detail to avoid unnecessarily obscuring the disclosure.

The description may use the terms "embodiment" or "embodiments," which may each refer to one or more of the same or different embodiments. The terms "comprising," "including," "having," and the like, as used with respect to embodiments, are synonymous, and are generally intended as "open" terms—e.g., the term "includes" should be interpreted as "includes but is not limited to," the term "including" should be interpreted as "including but not limited to," and the term "having" should be interpreted as "having at least." The terms "transmitting," "rendering," "sending," "serving," "receiving," "generating," "processing," "providing," and the like, refer to the actions and/or processes of a computer system, computer, or electronic device, that manipulates and/or transforms data within the memory or registers of a computer system, computer, or electronic device.

Regarding the use of any plural and/or singular terms herein, those of skill in the relevant art can translate from the plural to singular and/or from the singular to the plural as is appropriate to the context and/or application. The various singular and/or plural permutations maybe expressly set forth herein for the sake of clarity. The embodiments of the disclosure may be understood by reference to the drawings, wherein like parts may be designated by like numerals. The elements of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure. In addition, the steps of any method disclosed herein do not necessarily need to be executed in any specific order, or even sequentially, nor need the steps be executed only once, unless otherwise specified.

Consistent with various embodiments disclosed herein, systems and methods of the present disclosure may be implemented using one or more computers or other electronic devices, including portable computing devices such as smartphones, laptops, or tablets; one or more servers such as web servers, application servers, cloud servers, server clusters, file servers, media servers, local servers, remote servers and database servers. The one or more computers or electronic devices may be able to communicate either directly or indirectly with other computer devices and/or one or more servers via intermediate devices and/or one or more networks such as the Internet, WANs, LANs, and the like. The one or more computers or electronic devices may include internal communication means for communicating information, and one or more processors coupled to the communication means for processing such information. The one or more computers or electronic devices may also include memory (e.g., read only memory (ROM), random access memory (RAM), dynamic random-access memory (DRAM), main memory, etc.) coupled to a communication means (e.g., bus) for storing information and/or instructions to be executed by the one or more processors. The one or more computers or electronics devices may also be coupled to storage devices such as magnetic disks, optical disks, floppy disks, cloud servers, and the like.

The one or more computers or electronic devices may be able to interact with a user so that the user can view online multi-media content and purchase products associated with such multi-media content. This user interaction may be facilitated using a display device such as a liquid crystal display (LCD), light emitting diode (LED), and the like, that may be coupled to communication means for displaying information to a user. This user interaction may also be performed using a computer mouse, pen or stylus, or touch and/or voice commands. The methods and systems of the present disclosure can be implemented on any existing or future computer or electronic device with the processing capability to perform the functions described herein. Similarly, the scope of the present disclosure is not limited by the type of computer, electronic device, computer network, or computer hardware or software used.

In recent years, with the increasing availability of online multi-media content, marketing and presentation strategies have shifted from text-based strategies to multi-media-based strategies because videos (and other types multi-media content) can do what text cannot. They can create an immediate and more connective and engaging environment in which users may be entertained, educated, and the like, all at once. This presents opportunities for businesses who would like to sell their own (or a third party's) product(s) that may be featured in or associated with such multi-media content. Accordingly, a multi-media point-of-sale transaction solution that does not disrupt the immediate, connective, and engaging environment of multi-media content viewing and allows a user to buy products featured in (or associated with) such content is needed. Embodiments disclosed herein provide systems and methods for an embeddable point-of-sale transaction application that maintains the immediate, connective, and engaging environment of multi-media content viewing by, among other things, allowing a user to view multi-media content and simultaneously purchase products featured in (or associated with) such content and avoiding redirection away from such viewing.

In FIG. 1, as exemplary system 100 that provides the capability to embed a point-of-sale transaction application 108 within an online multi-media content viewing environment is shown. In particular, consistent with embodiments of the present disclosure, the system 100 may embed a point-of-sale transaction application 108 within an online multi-media content viewing environment in a manner the maintains the immediate, connective, and engaging environment of the multi-media content by, among other things, allowing a user to view the multi-media content and simultaneously purchase products featured in (or associated with) such content. In other words, consistent with embodiments of the present disclosure, the system 100 allows a user to view multi-media content and simultaneously purchase product(s) featured in (or associated with) the multi-media content while the content is still being viewed.

The system 100 may include one or more external platforms 102 communicatively, physically and/or electronically connected via a network 104 to a point-of-sale (POS) server 106. Some examples of external platforms 102 consistent with embodiments of the present disclosure include, without limitation, computing devices such as desktop and laptop computers, portable devices such as tablets, smartphones, smartTV, wearable devices such smartwatches, device enabled clothing (e.g., smart clothing), or any other computing device or computing-capable article. Some examples of a network 104 consistent with embodiments of the present disclosure include, without limitation, Internet, wide area network (WAN), local area network (LAN), personal area network (PAN), wireless local area network (WLAN), campus area network (CAN), metropolitan area network (MAN), system-area network (SAN), passive optical local area network (POLAN), enterprise private network (EPN), virtual private network (VPN), and the like. Some examples of a POS server 106 consistent with embodiments of the present disclosure include, without limitation, web server, server cluster, cloud server, file server, media server, database server, and the like. For purposes of clarity, the POS server 106 illustrated in FIG. 1 is shown as a single server, however, it should be understood that the functionality of the POS server 106 (or platform) may be distributed across multiple servers (or platforms). In this case, each one of the multiple servers (or platforms) (not shown) may be communicatively, physically and/or electronically connected to another one of the multiple servers (or platforms) (not shown) and/or communicatively, physically and/or electronically connected via a network 104 to one or more external platforms 102.

In one embodiment, the POS server (or platform) 106 may include an embeddable point-of-sale (POS) transaction application 108, an e-Commerce database 110, a payment processing service 112 and asset storage 114. The embeddable POS transaction application 108 may be electronically and/or physically connected to the e-Commerce database 110, payment processing service 112, and asset storage 114 of the POS server 106.

Referring still to FIG. 1, each of the one or more external platforms 102 may be capable of rendering multi-media content such as video, mixed reality, virtual reality, augmented reality content, and the like. In one embodiment, such multi-media content may be rendered on an external platform 102 via an application that is downloaded to (or otherwise resides on) the external platform 102. Such applications may include, without limitation, desktop applications, web applications, mobile applications, websites, webpages, and the like with the multi-media content displayed within the same GUI so that, among other things, a user can explore product details and features and purchase featured products. In one embodiment, as discussed with respect to FIG. 2, a reference may be embedded in an application so that when a user opens the application on an external platform 102, the reference resolves to the POS server 106. In turn, the POS server 106 may invoke the POS transaction application 108, thereby causing multi-media content to be loaded into a viewing area of a graphical user interface (GUI) 300 (FIG. 3) on the external platform 102, and featured products associated with the multi-media content displayed within the same GUI 100 so that, among other things, a user can explore product details and features and purchase featured products. In some embodiments, the embedded reference of the present disclosure may be implemented using Iframe, scripts, or the like. In one embodiment, an embedded reference may be implemented using Iframe, scripts, or the like. However, any implementation may be used that provides the capability to actively load content from the POS transaction application 108 over the network 104 and embed it in an external platform 102 to, among other things, view multi-media content and purchase products featured in (or associated with) such content, all at the same time.

Referring still to FIG. 1, in various embodiments, when a request to the POS server 106 is made to complete a purchase from an external platform 102, transactional data related to the purchase may be received by the embeddable POS transaction application 108 and stored in the e-Commerce database 110. This transactional data may include, without limitation, a user's geolocation, payment and shipping methods, and other relevant data associated with a typical POS transaction. This data may be parsed and validated by the e-Commerce database 110 and payment processing service 112. For example, the data may be parsed and validated using JSON (JavaScript Object Notation) and Fetch API methods. Upon validation, both the e-Commerce database 110 and the payment processing service 112 may store relevant POS transaction data (e.g., payment methods or other profile data) and the payment processing service 112 may send a response to the embedded POS application's 108 request. For example, in one embodiment, a response acknowledging that a payment has been validated may be sent from the payment processing service 112 to the POS transaction application 108 via the POS server 106 in Javascript Object Notification (JSON) format, or the like. In turn, the embedded POS application 108 may interpret this response and transition a GUI 300 (FIG. 3) appropriately. For example, a failure response (e.g., invalid credit card), may cause a GUI 300 of the embeddable POS application 108 to display an error warning with instructions on why the purchase could not be completed. In the case of a success response (e.g., POS transaction finalized and payment charge successful), a GUI 300 (FIG. 3) of the embeddable POS application 108 may transition the user's view within a GUI 103 running on an external platform 102 to a confirmation screen. Even here, the multi-media content continues to be displayed to the user In various embodiments, the payment processing service 112 shown in FIG. 1 may receive payment method information from the embeddable POS transaction application 108 and serve (or send) processed payment charge information back to the POS server 106. Payment method information may include, without limitation, e-mail address, first and last name, credit/debit card number, expiration, name on card, and Card Verification Value (CVV), and billing address. Processed payment charge information may include, without limitation, timestamps, charge status, credit/debit card fingerprints, charge amount(s), and transaction identifiers. Additionally, in some embodiments, the payment processing service 112 may be communicatively, physically and/or electronically connected via a network 104 to one or more third-party payment processing systems (not shown) to process payments for multi-media content featured products.

As further shown in FIG. 1, the asset storage 114 of the POS server 106 may store assets that include, without limitation, graphical user interfaces for the embeddable POS transaction application 108, images of products for the embeddable POS transaction application 108, software (i.e., code) associated with the embeddable POS transaction application 108 and multi-media content (e.g., live video files, recorded video files, music files, etc.) for viewing by a user from an external platform 102. In one embodiment of the present disclosure, the e-Commerce database 110 and the asset storage 114 may be physically and/or functionally combined.

In one embodiment, product image files (e.g., images depicting products being sold) may be uploaded directly to the POS server 106 and stored in the asset storage 114 and a "pointer reference" to a URL associated with the product image file may be stored in the e-commerce database 110. The format of the pointer reference may be a relative reference with a relative-path or absolute-path, an absolute-URI (Uniform Resource Identifier), or a network-path. This pointer reference may be created by the e-commerce database 110 and may be used to render multi-media content in a GUI 300 (FIG. 3) at an external platform 102. In addition to product images, other information associated with a product may be uploaded to the POS server 106. For example, product name, SKU, price, dimensions, weight, product description, category (e.g., gender, size, color, etc.), shipping method and/or terms, and the like, may be uploaded to the POS server 106 and stored on the e-Commerce database 110. In some embodiments, product images and associated product information may be uploaded by a merchant (i.e., product owner), using an e-Commerce dashboard (not shown) that may be provided by the POS server (or platform) 106 via the network 104 to a computing device such as a desktop, laptop, or a portable device such as a tablet, smartphone, wearable device, or any other computing device or computing-capable article. In one embodiment, an e-Commerce dashboard (not shown) may also allow merchants (i.e., product owners) to manage product inventory, create multi-media content (e.g., live streams, videos, shows, shorts, etc.) and manage any purchase orders for products featured in (or associated with) such multi-media content.

In one embodiment of the present disclosure, live or pre-recorded multi-media content may also be uploaded to the POS server 106 and stored in an asset storage 114. For example, in the case of live multi-media content, when a show begins, the e-Commerce database 110 may be updated with a "pointer reference" to a URL associated with the live multi-media content. This pointer reference may be created by the e-Commerce database 110 and may be used to render the live multi-media content (e.g., live video stream, etc.) in a GUI 300 (FIG. 3). The format of the pointer reference may be a relative reference with a relative-path or absolute-path, an absolute-URI (Uniform Resource Identifier), or a network-path. After the live show has been completed, the recorded live stream may be automatically uploaded by the e-Commerce database 110 to the asset storage 114 of the POS server 106. A pointer reference to a URL associated with the live multi-media content may then be replaced by the e-Commerce database 110 with a pointer reference to a URL associated with the recorded multi-media file stored on the asset storage 114.

In the case of pre-recorded multi-media content, pre-recorded multi-media files may be uploaded to the asset storage 114 of the POS server 106 using the same approach as is used to upload product image files. More specifically, pre-recorded multi-media files may be uploaded directly to the POS server 106 and stored on the asset storage 114 and a "pointer reference" to a URL associated with the pre-recorded multi-media file may also be stored in the e-Commerce database 110. The format of the pointer reference may be a relative reference with a relative-path or absolute-path, an absolute-URI (Uniform Resource Identifier), or a network-path. This pointer reference may be created by the e-Commerce database 110 and may be used to render the pre-recorded multi-media file in a GUI 300 (FIG. 3) on the external platform 102. In some embodiments, pre-recorded multi-media files may be uploaded by merchants (i.e., product owners), using an e-commerce dashboard (not shown) that may be provided by the POS server (or platform) 106 via the network 104 to a computing device such as a desktop, laptop, or a portable device such as a tablet, smartphone, wearable device, or any other computing device or computing-capable article.

In one embodiment, an e-Commerce Database 110 may associate particular products (including their images and other associated information) with particular multi-media content and/or a particular merchant. More specifically, when a product image is uploaded or multi-media content is created and/or uploaded, the e-Commerce database 110 may associate a merchant and one or more of their products with a particular piece of multi-media content. For example, a piece of multi-media content may be associated with an "event" identifier (i.e., event=event.id). The "event" may be further associated with one or more products (i.e., event.product_id=product.id, etc.), and finally the "event" may be associated with a merchant (i.e., event.merchant_id=merchant.id). For illustrative purposes only, this information may be periodically updated using the following simplified exemplary code segments: (1) startShow->createLiveTranscoder->createCDN->updatePointerReference (in the e-Commerce database)->startRecording, and (2) endShow->endRecording->uploadRecording (to asset storage)->updatePointerReference (in the e-Commerce database)

Figure 2:
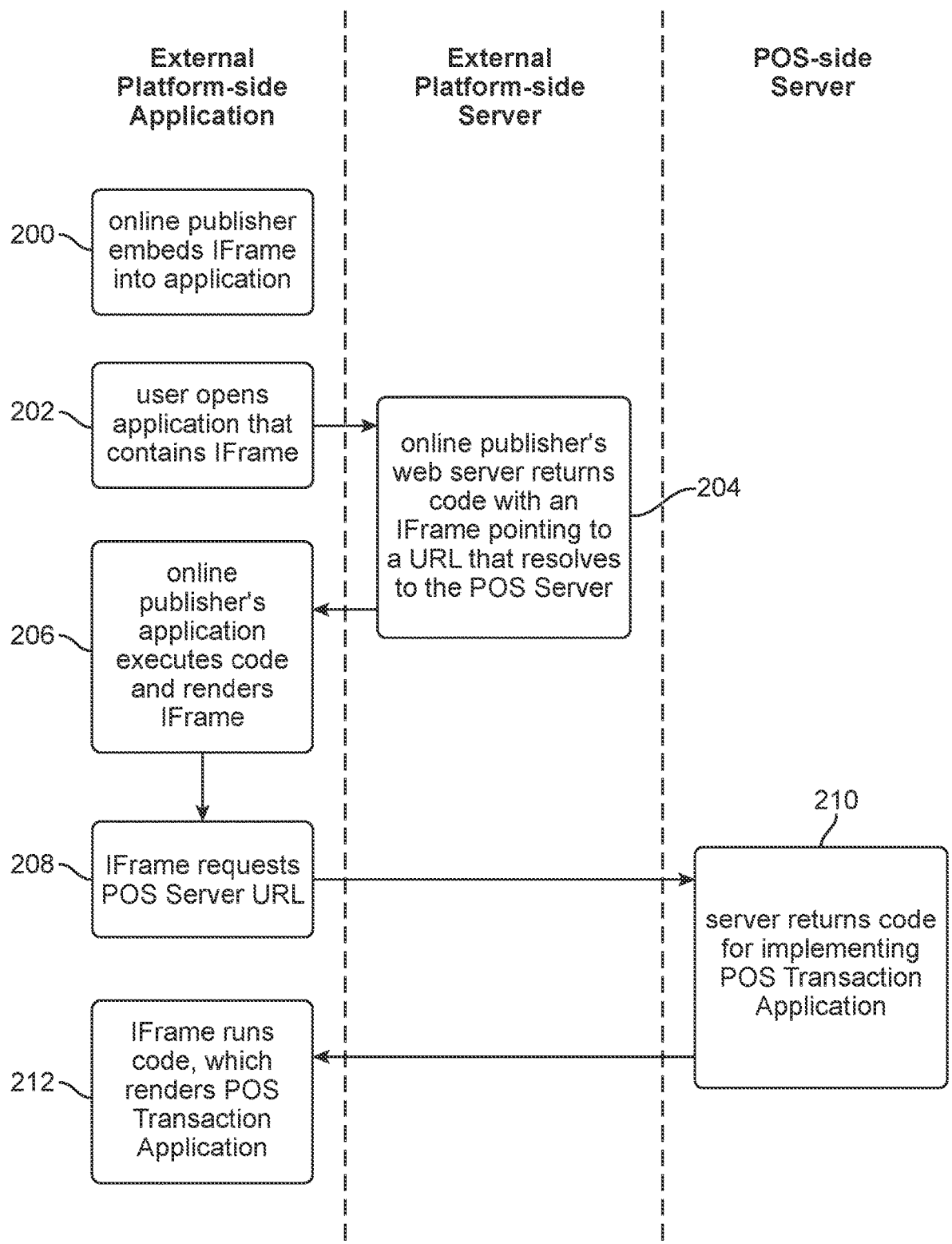
FIG. 2 illustrates a flow chart of an exemplary method for delivering point-of-sale-transaction embedded multi-media content consistent with embodiments of the present disclosure.

FIG. 2 is a flow diagram of a method of the present disclosure wherein an embeddable POS transaction application 108 that may reside on one or more servers is configured to deliver a graphical user interface (GUI) 300 (FIG. 3) within an application of an external platform 102 to allow a user of an external platform 102 to control the viewing of multi-media content running on the external platform 102 and purchase product(s) associated with the multi-media content. At 200, in one embodiment, a point-of-sale transaction application 108 may be embedded in a webpage associated with an external platform 102 using HTML Inline Frame elements (e.g., <IFrame>); however, any other mechanism for embedding one HTML page into another computer program may be used.

At 202, when a user opens a computer program that contains the embedded POS transaction application 108, a "GET" request may be sent to a server associated with the computer program, which prompts the POS server 106 to respond (at 204) by returning HTML and/or other web-based framework code such as JavaScript, Cascading Style Sheets (CSS), and JavaScript Object Notation (JSON), collectively referred to herein as "HTML code," within an IFrame (or the like) whose source points to a URL and document (i.e., webpage) located on the POS server 106. This HTML code may render a GUI 300 (FIG. 3) within the IFrame of a user's browser and is made up of text, multi-media, and the underlying functionality (i.e., JavaScript code) to execute any number of desired behaviors of the GUI 300, such as video controls, navigation, stylization, and form validation.

At 206, upon receiving the HTML code, the user's browser may render the POS application 108 inside the IFrame (or the like). At 208, the IFrame may request the POS server 106 URL, which may cause a "GET" request to be sent to the POS server 106. At 210, the POS server 106 may respond to the "GET" request by returning the HTML code for rendering the POS application 108 inside the Iframe (at 212). It is important to note, however, that the functionality of the embeddable POS transaction application 108 consistent with various embodiments of the present disclosure may be implemented in ways other than as described in FIG. 2. For example, the POS transaction application 108 functionality may be implemented in desktop or mobile applications using alternative application frameworks. Moreover, the embeddable POS transaction application 108 functionality of the present disclosure may be extendable as a referenced JavaScript code module.

As discussed above, an embeddable POS transaction application 108 may include functionality for delivering a graphical user interface (GUI) 300 on an external platform 102 to allow a user of the external platform 102 to control the viewing of content running on the external platform 102 and purchase product(s) associated with the multi-media content, all at the same time. FIGS. 3A through 3G show exemplary GUI 300 components consistent with embodiments of the present disclosure. These exemplary user interfaces are for illustrative purposes only and should not be construed as limiting the scope of any GUI 300 features, layouts, configurations, or content consistent with embodiments of the present disclosure.

Figure 3A:
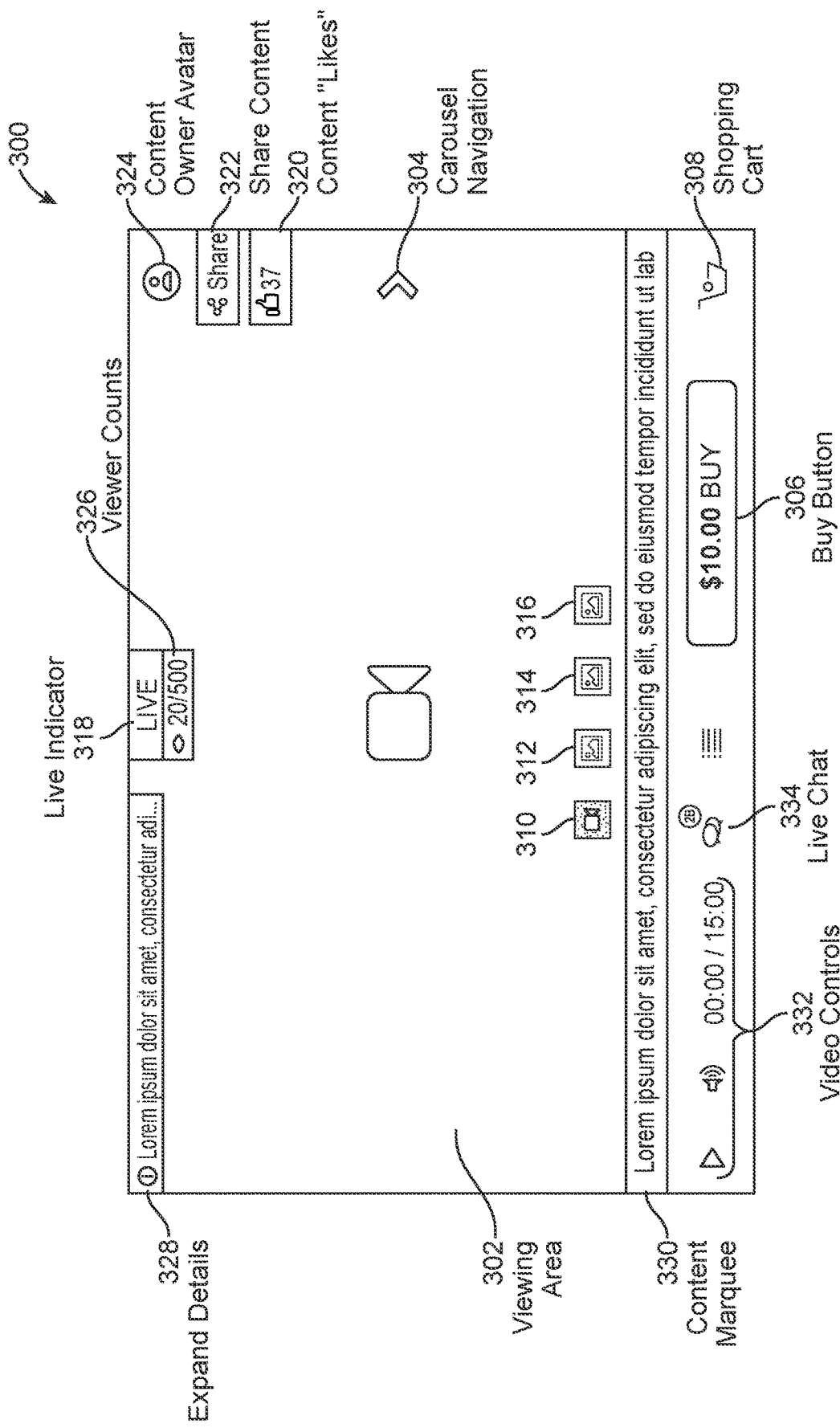
FIG. 3A illustrates an exemplary graphical user interface (GUI) consistent with embodiments of the present disclosure.

For example, FIG. 3A illustrates an exemplary GUI 300 that comprises a viewing area 302 in which multi-media content may be loaded, and featured products associated with the multi-media content displayed so that a user can easily interact with and explore product details and features.

Figure 3B:
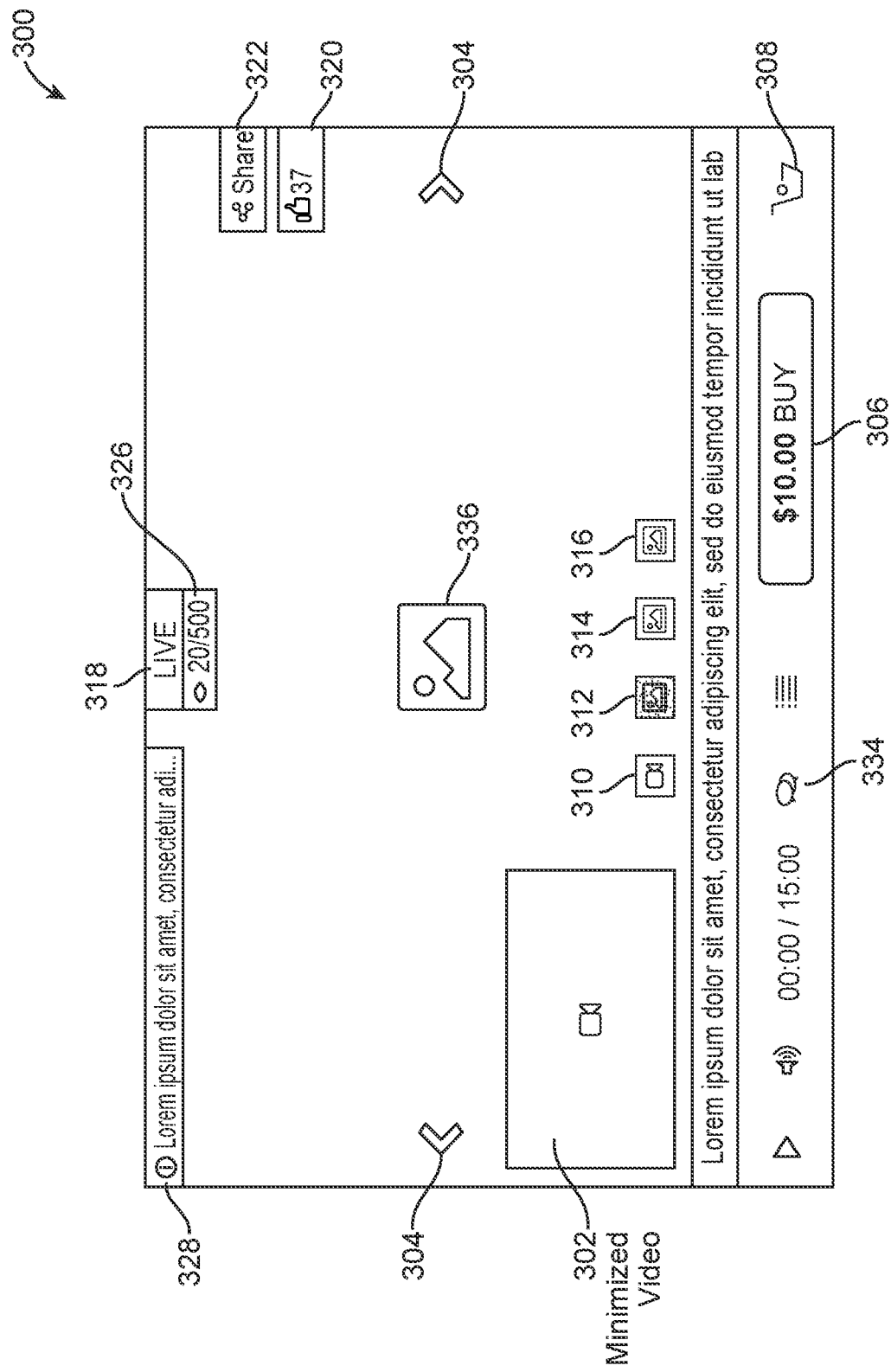
FIG. 3B illustrates an exemplary graphical user interface (GUI) consistent with embodiments of the present disclosure.

In one embodiment, the viewing area 302 may be referred to as a "carousel" because elements displayed in this area 302 may be navigated from left to right using navigation elements 304 (see also FIG. 3B) or the layout of the viewing area 302 changed using navigation elements 310 (to maximize the viewing area 302 of a live or recorded video), 312 (to view images depicting products being sold (i.e., product image files), 314 (to view images depicting products being sold (i.e., product image files), or 316 (to minimize the viewing area 302 to display featured content as discussed below with respect to FIG. 3B). The exemplary GUI 300 may further comprise a "buy button" 306. The "buy button" 306 may be selected by a user to purchase product(s) featured in (or associated with) the multi-media content displayed in the viewing area 302. When the buy button 306 is selected, the embeddable POS transaction application 108 of the present disclosure may cause the selected featured product to be added to a user's shopping cart, as graphically indicated by a cart icon 308.

As further illustrated in FIG. 3A, the exemplary GUI 300 may also include a live icon and notification icon 318 that on selection by a user may open a live chat area or window (not shown) within the IFrame (or the like) that allows the user to communicate in real-time with other users that may be viewing or have viewed the same multi-media content. Clickable icons and number(s) 320 indicating the number of viewers who have "Liked" the multi-media content or product featured therein may further be included. A clickable share feature 322 that allows a user to share multi-media content and/or the embeddable IFrame itself with others via such communication methods as e-mail, social media, and the like is also shown. An icon 324 that may represent an avatar of the seller of the product being viewed that has created the multi-media content may also be included. For example, product owners may select an avatar that identifies their brand and/or product(s) to users who may view their multi-media content.

Referring still to FIG. 3A, an exemplary GUI 300 consistent with embodiments of the present disclosure may include statistics 326 indicating the number of viewers who are currently watching multi-media content and the to-date total number of viewers may also be included, and the like. Other features of the GUI 300 may include product and/or multi-media content descriptions 328 that, when selected by a user, expand to provide additional detail about the product and/or the multi-media content (see FIG. 3C). A marquee area 330 may also be included that contains additional information relevant to multi-media content or products featured therein. Multi-media content player controls 332 and live chat options 334 may further be included. A GUI 300 may also comprise icons that indicate navigation to other artifacts (e.g. product images, description, rating, and category) associated with a featured product.

Consistent with embodiments of the present disclosure, FIG. 3B illustrates an exemplary GUI 300 that further comprises a multi-media content viewing area 302 that is minimized to display a featured product 336. By minimizing the multi-media content viewing area 302—i.e., via a "carousel" navigation element 312 (FIG. 3A)—the user can view the multi-media content and featured product details at the same time.

Figure 3C:
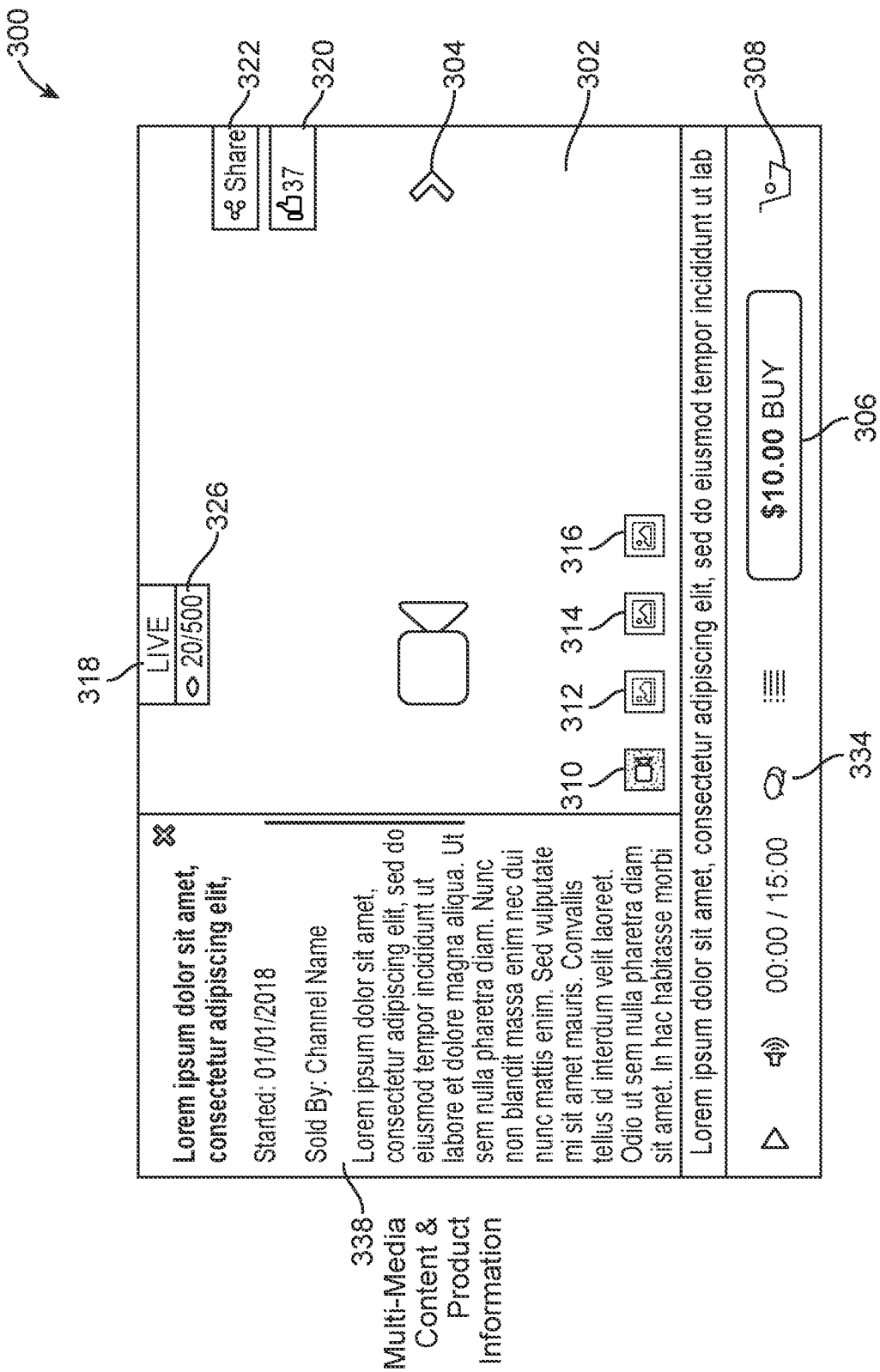
FIG. 3C illustrates an exemplary graphical user interface (GUI) consistent with embodiments of the present disclosure.

Consistent with embodiments of the present disclosure, FIG. 3C further illustrates an exemplary GUI 300 comprising product information and related multi-media content information 338. For example, a POS server 106 may provide rich context from the e-Commerce database 110 about the details of the multi-media content, the product offering, and other relevant metadata. This data may be displayed in the GUI 300 of the embeddable POS application 108 and accessible by clicking on any number of visual cues that invite a user to explore more details about the multi-media and product. The GUI 300 may be designed to maximize a user's viewing area 302 while keeping the user immersed in the multi-media content. In another embodiment, a series of expandable views may be encapsulated within various selectable visual cues for the user to achieve said immersion.

Figure 3D:
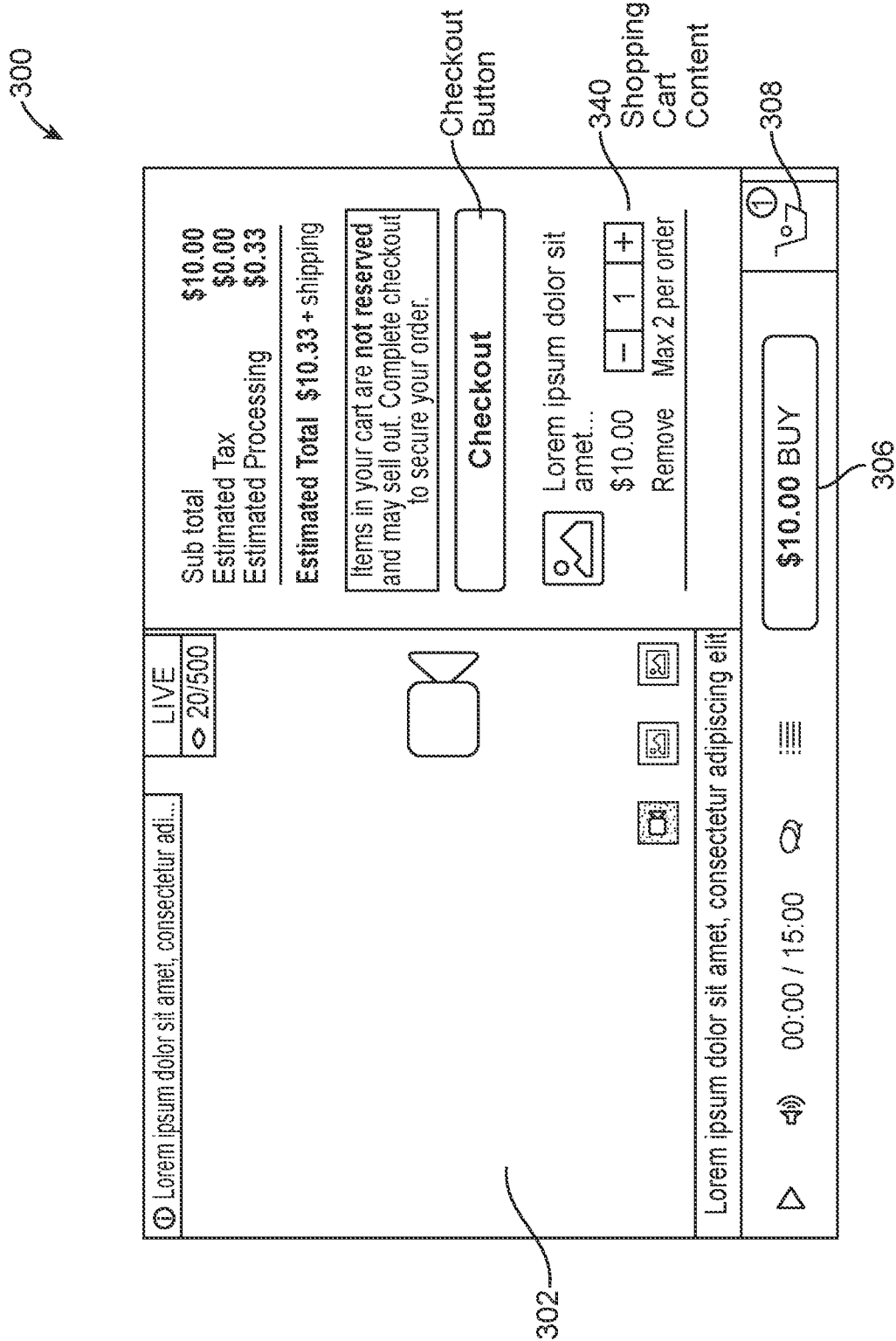
FIG. 3D illustrates an exemplary graphical user interface (GUI) consistent with embodiments of the present disclosure.

Consistent with embodiments of the present disclosure, FIG. 3D further illustrates an exemplary GUI 300 comprising a shopper's cart and associated elements 340, including a checkout button 342. Here again, the GUI 300 may include a viewing area 302 that continues to display the multi-media content.

Figure 3E:
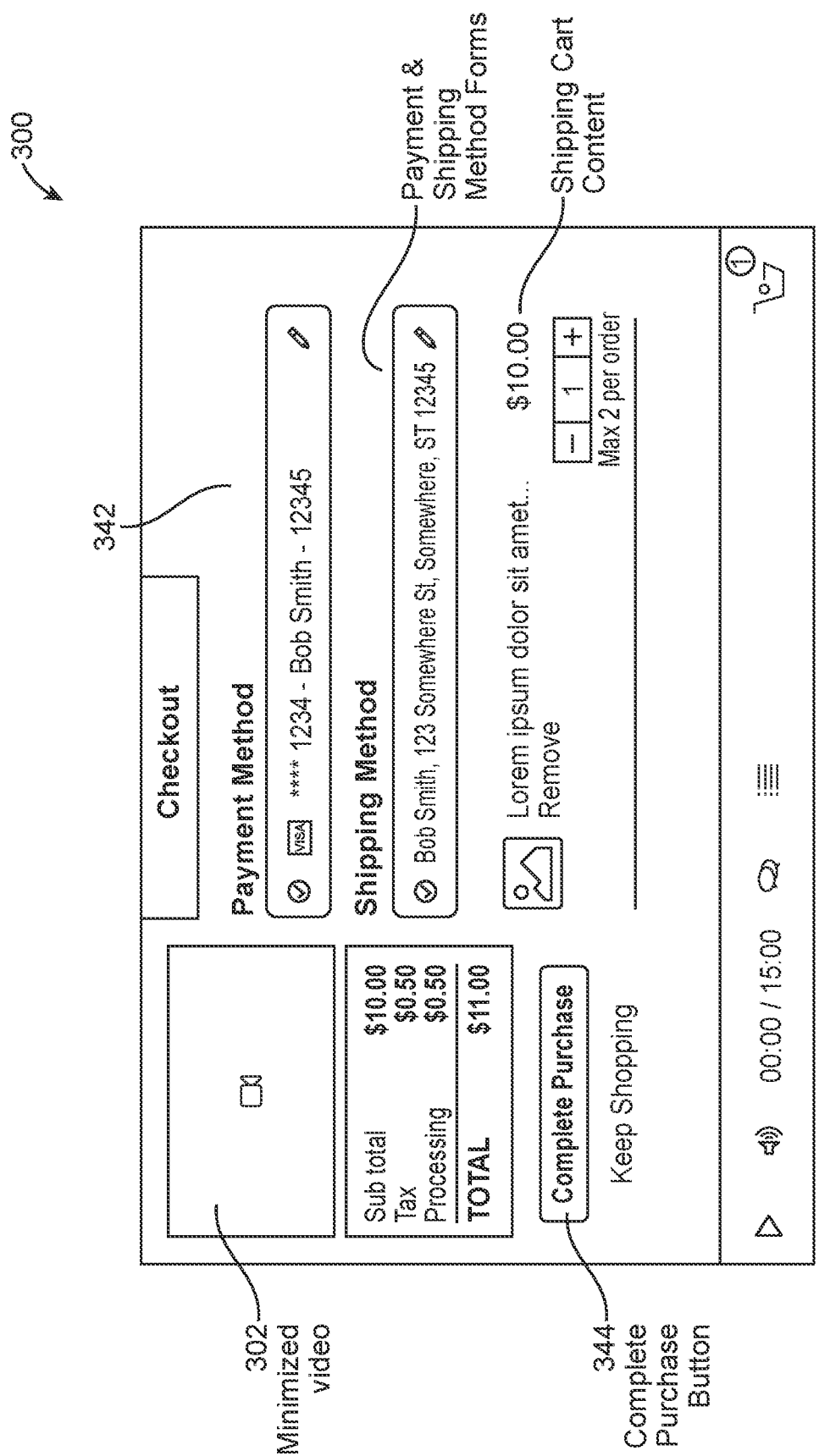
FIG. 3E illustrates an exemplary graphical user interface (GUI) consistent with embodiments of the present disclosure.
Figure 3F:
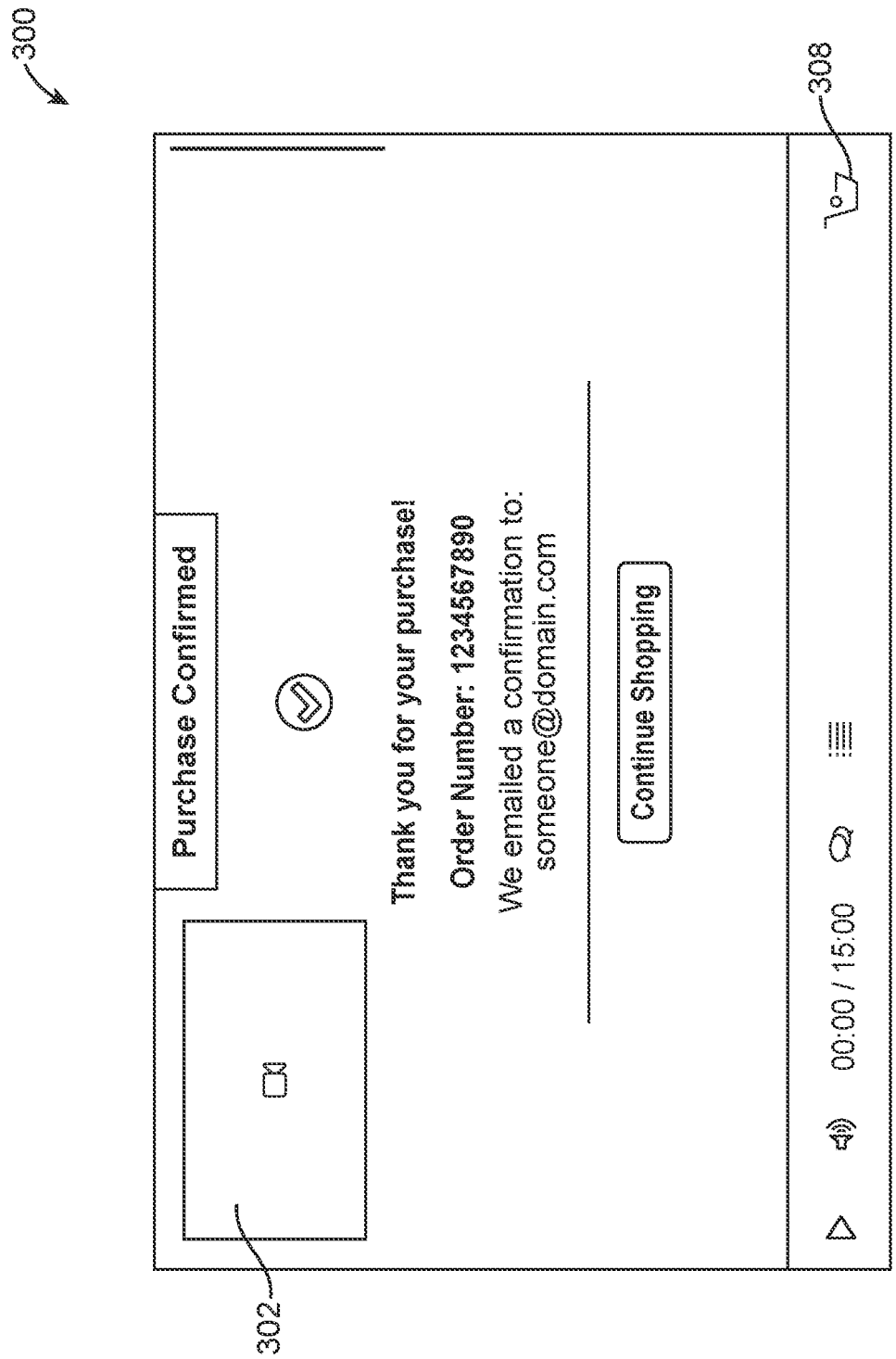
FIG. 3F illustrates an exemplary graphical user interface (GUI) consistent with embodiments of the present disclosure.

Consistent with embodiments of the present disclosure, FIG. 3E further illustrates an exemplary GUI 300 comprising a checkout view 342, which includes areas where payment and shipping method information may be entered by a user. When a user provides their payment and shipping methods, such data may be sent to the POS server 106 and a payment processing service 112 may validate the data and stores it in the e-commerce database 110. A selectable button 344 is also included to complete a purchase. When the complete purchase button 344 is selected, a request may be sent to the POS server 106 to finalize the user's order. This request may be validated by the e-Commerce database 110 and payment processing service 112 and the user's order may then be charged and finalized. Upon successfully finalizing the order, the user may be shown an order confirmation view (FIG. 3F). As further shown in FIG. 3E, the GUI 300 may include a viewing area 302 that continues to display the multi-media content.

Consistent with embodiments of the present disclosure, FIG. 3F further illustrates an exemplary GUI 300 that may confirm a user's purchase. In particular, this screen may be displayed when a user has added an item to their cart 308, completed the necessary payment and shipping method forms, provided an e-mail address, selected a complete order button, and had their payment method, shipping method, and order details verified by the POS server 106. As further shown in FIG. 3F, the GUI 302 may include a viewing area 302 that continues to display the multi-media content.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein but may be modified within the scope of equivalents of the disclosed embodiments.

What is claimed is:

1. A system for delivering online content comprising:
   a server, the server comprising an embeddable application, wherein the embeddable application is communicatively coupled to at least one of a database or a payment processing service; and
   a publisher platform communicatively coupled to the server, the publisher platform comprising an application, wherein the application comprises a reference to the server, wherein the reference is configured to resolve to the server to provide the publisher platform access to the embeddable application, wherein the embeddable application is configured to deliver a graphical user interface and multi-media content from the server to the publisher platform for viewing on a device communicatively coupled to the publisher platform, and wherein the embeddable application is configured to render the multi-media content within the graphical user interface, wherein product(s) or service(s) associated with or featured in the multi-media content are capable of being purchased by a user of the device without redirection and within the graphical user interface where the multi-media content is rendered, wherein the product(s) or the service(s) associated with or featured in the multi-media content are capable of being purchased by the user of the device at the same time the multi-media content is rendered, and wherein the product(s) or the service(s) associated with or featured in the multi-media content are capable of being purchased by the user of the device without obstruction of the multi-media content.

2. The system of claim 1, wherein the device is a computing device.

3. The system of claim 2, wherein the computing device is selected from a group consisting of a desktop computer, a laptop computer, a tablet, a smartphone, smartTV, a wearable device, or device enabled clothing.

4. The system of claim 1, wherein the server is communicatively coupled to the publisher platform via a network.

5. The system of claim 1, wherein the reference is a script.

6. The system of claim 1, wherein the reference is an Iframe.

7. The system of claim 1, wherein the database is configured to store transaction data related to a purchase request received by the embeddable application.

8. The system of claim 7, wherein the payment processing service is configured to validate the purchase request.

9. The system of claim 1, wherein the server further comprises an asset storage communicatively coupled to the embeddable application, and wherein the asset storage is configured to store at least one asset selected from a group consisting of the graphical user interface, images of the product(s) for use by the embeddable application, software associated with the embeddable application, or the multi-media content.

10. The system of claim 1, wherein the embeddable application is configured to cause the multi-media content to be loaded into a viewing area of the graphical user interface.

11. The system of claim 1, wherein the graphical user interface further comprises at least one feature selected from a group consisting of live chat, purchasing the product(s) or the service(s) associated with or featured in the multi-media content, shopping cart, share content, like content, navigation tools, content owner avatar, multi-media content information, or information about the products and/or the service(s) featured in the multi-media content.

12. The system of claim 1, wherein the multi-media content is live or pre-recorded.

13. The method of claim 1, wherein the device is communicatively coupled to the publisher platform via a network.

14. The method of claim 1, wherein the publisher platform is a Web server.

15. A method of delivering online content, the method comprising:

receiving a request from a device at a publisher platform to access an application of the publisher platform, wherein the device is communicatively coupled to the publisher platform, wherein the application comprises a reference to a server, wherein the publisher platform is communicatively coupled to the server, wherein the server comprises an embeddable application, and wherein the embeddable application is communicatively coupled to at least one of a database or a payment processing service;

in response to the request, the reference resolving to the server to provide the publisher platform access to the embeddable application;

delivering a graphical user interface and multi-media content from the server to the publisher platform via the embeddable application; and presenting the graphical user interface and the multi-media content to the device via the publisher platform, wherein product(s) or service(s) associated with or featured in the multi-media content are capable of being purchased by a user of the device without redirection and from within the graphical user interface where the multi-media content is rendered, wherein the product(s) or the service(s) associated with or featured in the multi-media content are capable of being purchased by the user of the device at the same time the multi-media content is rendered, and wherein the product(s) or the service(s) associated with or featured in the multi-media content are capable of being purchased by the user of the device without obstruction of the multi-media content.

16. The method of claim 15, wherein the device is a computing device.

17. The method of claim 16, wherein the computing device is selected from a group consisting of desktop computer, a laptop computer, a tablet, a smartphone, a smartTV, a wearable device, or device enabled clothing.

18. The method of claim 15, wherein the server is communicatively coupled to the publisher platform via a network.

19. The method of claim 17, wherein the reference is an Iframe.

20. The method of claim 15, further comprising the embeddable application storing transactional data related to a purchase request received by the embeddable application in the database.

21. The method of claim 20, further comprising the embeddable application validating the purchase request via the payment processing service.

22. The method of claim 15, further comprising storing at least one asset selected from a group consisting of the graphical user interface, images of products for use by the embeddable application, software associated with the embeddable application, or the multi-media content in an asset storage communicatively coupled to the embeddable application.

23. The method of claim 15, further comprising the embeddable application loading the multi-media content into a viewing area of the graphical user interface.

24. The method of claim 15, wherein the graphical user interface further comprises at least one feature selected from a group consisting of live chat, purchasing the product(s) or the service(s) associated with or featured in the multi-media content, shopping cart, share content, like content, navigation tools, content owner avatar, multi-media content information, or information about the products and/or services featured in the multi-media content.

25. The method of claim 15, wherein the multi-media content is live.

26. The method of claim 15, wherein the multi-media content is pre-recorded.

27. The method of claim 15, wherein the reference is a script.

28. The method of claim 15, wherein the device is communicatively coupled to the publisher platform via a network.

29. The method of claim 15, wherein the publisher platform is a Web server.

* * * * *